Figures 1, 3:
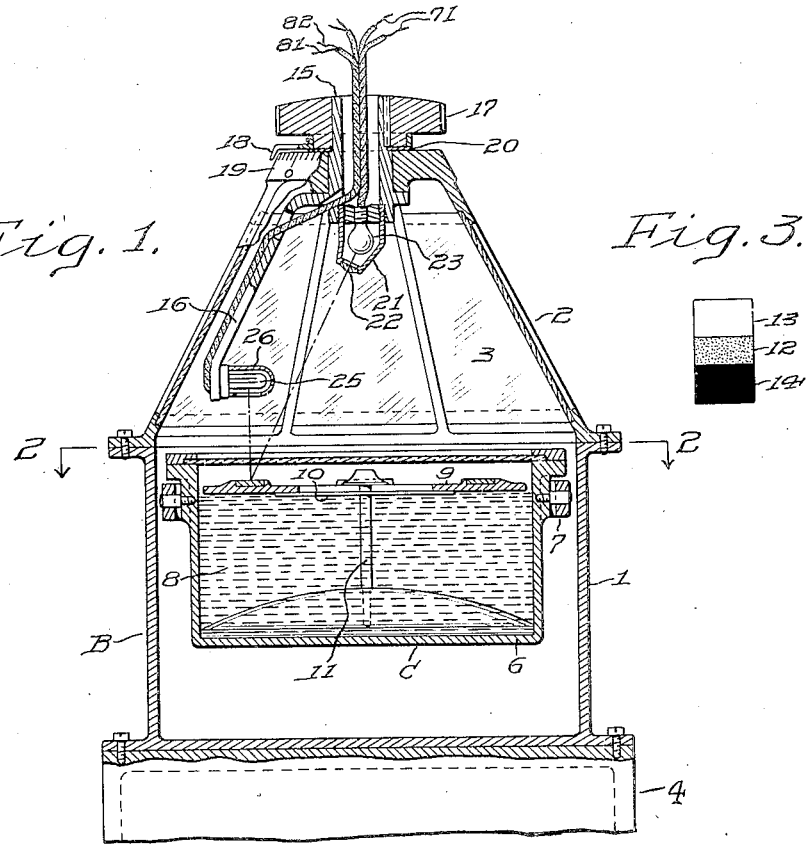

March 29, 1938.　　　G. E. MIRFIELD　　　2,112,504
STEERING APPARATUS
Filed July 16, 1932　　　3 Sheets-Sheet 1

WITNESS
F. J. Hartman.

INVENTOR
George E. Mirfield.
BY
ATTORNEY

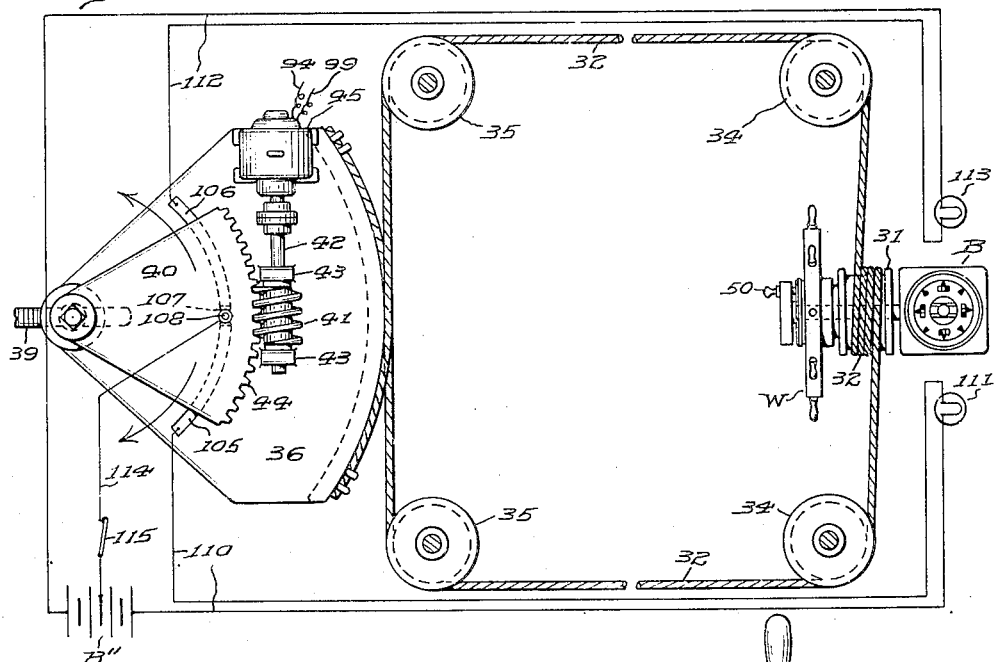
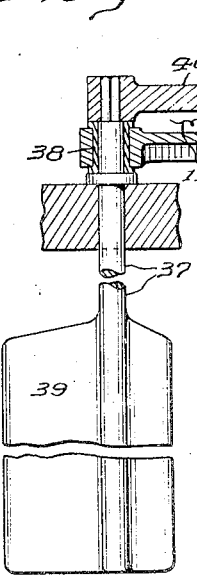
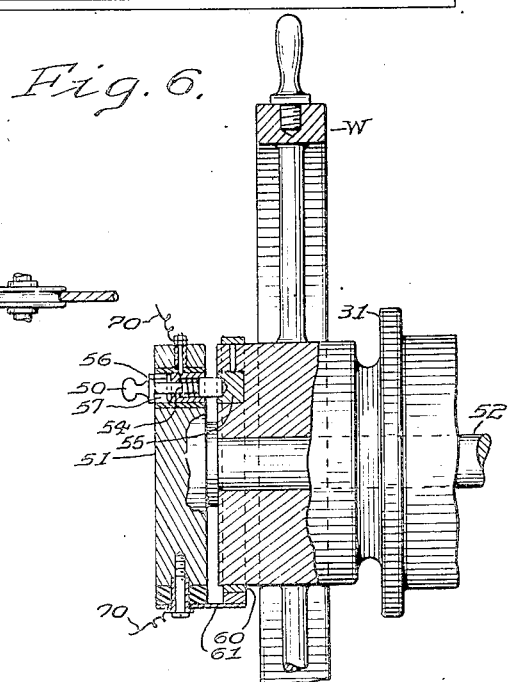

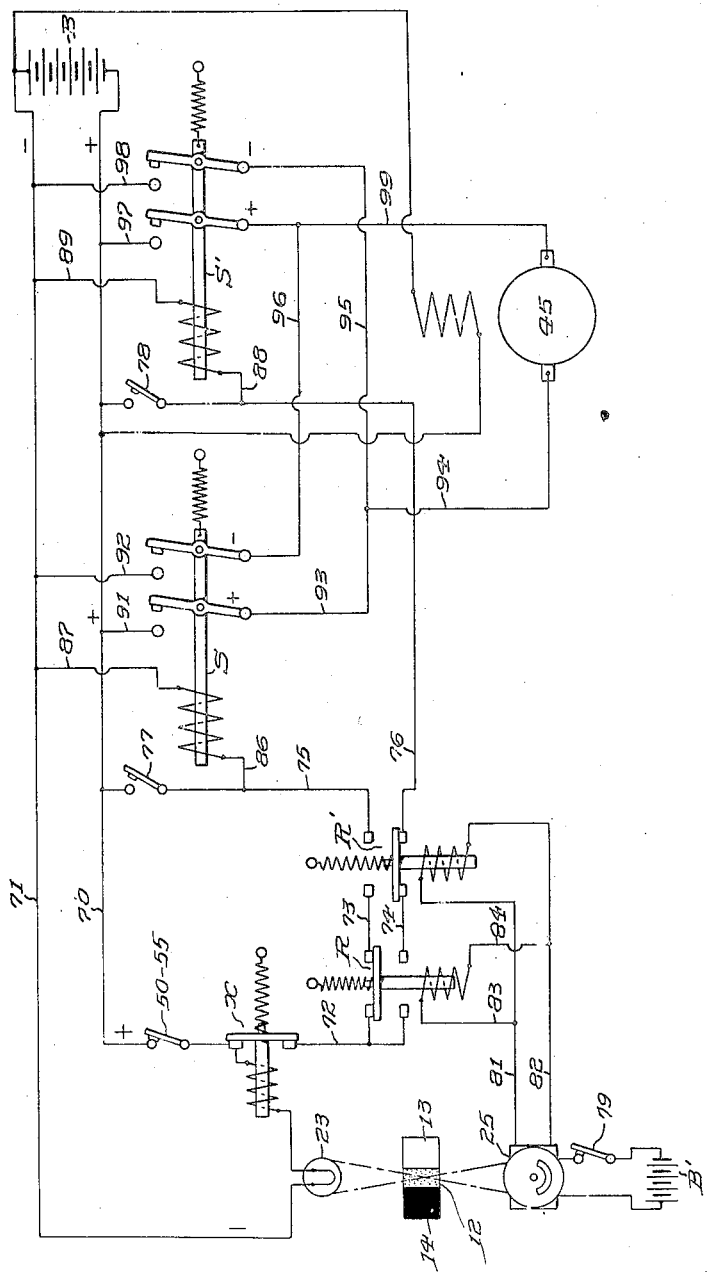

Patented Mar. 29, 1938

2,112,504

UNITED STATES PATENT OFFICE 2,112,504

STEERING APPARATUS

George E. Mirfield, Youngstown, Ohio, assignor to Curtiss L. Hill, Tacoma, Wash.

Application July 16, 1932, Serial No. 622,923

8 Claims. (Cl. 172—282)

This invention relates to apparatus for steering vessels, and more particularly contemplates the provision of means through the medium of which the vessel may be steered by hand in the ordinary way or automatically maintained substantially on a given course when desired, whereby the navigator of the vessel can selectively utilize either hand or automatic steering at will.

Certain forms of apparatus have heretofore been proposed for automatically maintaining a vessel substantially on a given course but, as far as I am aware, those which have been successful for the performance of their intended function are so complicated, cumbersome and expensive as to substantially preclude their use on vessels of smaller types such as pleasure yachts, motorboats and the like, while those which have been designed more particularly for employment on such vessels have not been entirely satisfactory under operative conditions.

The principal object of my invention, therefore, is to provide a relatively inexpensive, comparatively simple apparatus adapted to maintain a vessel on a predetermined course with sufficient accuracy for practical purposes of navigation and which is therefore operative to return it to such course when it has been deflected therefrom by local conditions such as wind, sea, or the like, in combination and association with means through the medium of which the vessel may be steered by hand in the ordinary manner whenever desired so that the navigator can employ either automatic or hand steering at will and can shift from one to the other quickly and with a minimum of difficulty.

A further object of the invention is the provision of apparatus of the character aforesaid which is of relatively simple nature and which does not embody heavy or cumbersome units such as gyroscopes and the like, and is therefore especially adapted for use on yachts, motorboats and other like vessels, yet which is accurate, reliable, and of a character to operate satisfactorily with a minimum of attention under the conditions of use to which it is necessarily subjected.

A further object of the invention is the provision, in association with the usual compass and binnacle, of means which, when in use, are adapted to automatically bring about a movement of the rudder suitable to return the vessel to the predetermined course on which she is proceeding should she deviate materially therefrom, yet which does not in any way interfere with the accuracy of the compass needle or require any corrections or allowances to be made in plotting the course other than those normally required for its proper determination.

A still further object of the invention is the provision of a novel combination of mechanism in association with the rudder stock through the medium of which the requisite movements may be imparted to the rudder when the vessel is being steered manually or automatically, said means comprising superposed quadrants and means operative to automatically lock them together for unitary movement under the former condition and to effect relative movement therebetween under the latter.

Other objects of the invention are the provision of means for effecting return of the quadrants to a predetermined relation when and as required; of means for constantly visually denoting to the navigator the relative position of the quadrants at a point remote therefrom, thus avoiding the necessity of inspecting them to ascertain such position; and of means for insuring the maintenance of the vessel substantially on the predetermined course for a reasonable period in case of burning out or other accident to the pilot light which forms a composite part of the automatic steering mechanism.

Other objects, purposes, and advantages of the invention will hereinafter more fully appear or be understood from the following description of a preferred embodiment thereof, reference being had to the accompanying drawings.

Figure 2:
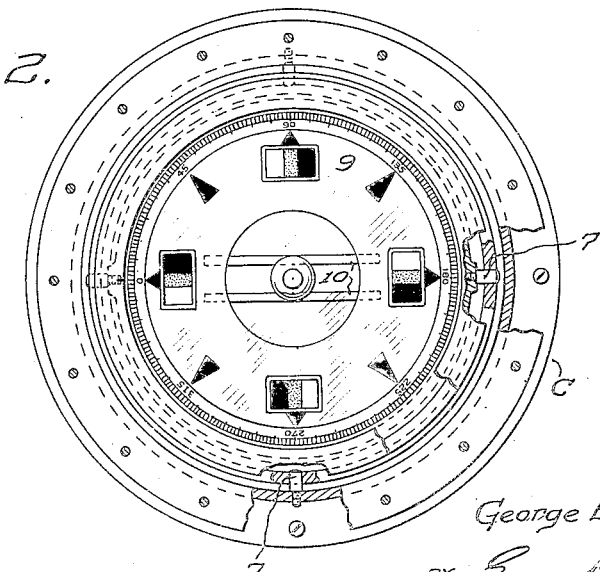

In the drawings, Fig. 1 is a vertical, central section through a binnacle of usual type having a magnetic compass mounted therein in the customary way with the parts suitably adapted for the purposes of the invention; Fig. 2 is a horizontal section through the binnacle on the line 2—2 in Fig. 1; Fig. 3 is a detail view of the respective reflecting zones which are disposed at one or more points on the compass card as hereafter more fully explained; Fig. 4 is a fragmentary, somewhat diagrammatic top plan view showing the steering quadrants, hand steering wheel and associated parts and indicating in general their relative relation; Fig. 5 is a vertical fragmentary section through the steering quadrants and associated parts, the rudder stock and rudder being shown in side elevation, and Fig. 6 is a fragmentary horizontal section through the steering wheel and associated parts, more particularly designed to show the means for throwing the automatic steering apparatus into operation and locking the hand steering mechanism. Fig. 7 is a line diagram of the main circuits and electrical mechanism employed, the various elements being shown in the condition assumed when the vessel is being steered automatically on a designated course. The same characters of reference are used to designate the same parts in the several figures.

It will be understood that in the following description of that embodiment of the invention shown in the drawings, the various mechanical and electrical instrumentalities illustrated and the circuits employed are to be deemed merely as preferred examples thereof, and that other instrumentalities and/or arrangements of circuits may be utilized in their stead for the performance of substantially similar functions if desired in accordance with and without departing from the principles of the invention.

Referring now more particularly to the specific embodiment of the apparatus which I have chosen to illustrate since it is one which is well adapted for use on yachts, motorboats and other similar vessels which are normally steered by hand, as distinguished from cargo carrying ships and the like which are usually provided with steam or other mechanically or electrically operated steering apparatus, the binnacle B comprises a casing 1 having a hood 2 disposed thereabove provided with panes of glass 3 through which the compass C may conveniently be observed, the binnacle, which may be provided with a shade (not shown) for excluding light from its interior in the usual way, being mounted on a pedestal 4 secured to the deck of the vessel at a convenient place adjacent the steering wheel W. The compass within the binnacle casing comprises a cup 6 carried on gimbals 7 so that the spirit bath 8 on which the compass card 9 normally floats is maintained in equilibrium or substantially so during movement of the ship, the cup being arranged to swing in one plane on one pair of gimbals and in a plane normal thereto on the other in the usual way. The compass card has secured to it magnetic needles 10 and is supported on a pivot 11 so that the north or zero point of the card normally points to the magnetic north pole. It will thus be apparent that the several parts to which reference has been made are of usual construction and are arranged to operate in the usual way.

In accordance with the present invention, the compass card is provided with certain specially arranged zones adjacent its north or zero point and preferably with similar zones adjacent its other quadrant points, namely, its east, south and west points, each of these zones, as best shown in Fig. 3, comprising a relatively narrow band 12 of neutral color in radial alignment with the adjacent compass point, bounded on one side by a white, silvered, or other relatively highly reflecting zone 13 and on the other by a substantially black or non-reflecting zone 14; the purpose of these different zones will hereinafter more fully appear.

The top part of the hood of the usual binnacle of the character shown is finished off with a covering plate, but in accordance with the present invention the upper part of the hood is divested of this plate and is employed for the support of certain mechanisms, as best shown in Fig. 1, which serve as energizing means for the steering circuit. More particularly, the binnacle hood may be provided with a sleeve 15 coaxial with the hood at its apex having an arm 16 extending downwardly and outwardly therebeneath, the lower end of this arm lying above and relatively close to the compass card. To the upper end of the sleeve above the extremity of the hood is secured a knurled head 17 by which the sleeve and its arm can be conveniently rotated, and a pointer 18 is in turn secured to the head in alignment with the arm so as to turn therewith, while the upper edge of the hood frame beneath the pointer is preferably graduated in degrees corresponding to those on the compass card, the north or zero point of this scale 19 being preferably coincident with or parallel to the longitudinal center line of the vessel. A friction washer 20 or other suitable means may be disposed beneath the knurled head so that the parts will be frictionally retained in any position of rotative adjustment to which they may be turned.

At the lower end of the sleeve 15 is mounted a shield 21 having a lens 22 disposed therein to reflect the light from an incandescent lamp or pilot light 23, mounted within the shield, downwardly toward the compass card in a relatively narrow beam adapted to impinge on the card in the path followed by the reflecting zones as the card revolves relatively to the binnacle, and at the lower end of the arm 16 is mounted a photoelectric cell 25 preferably enclosed in a shield 26 having a slot in its under side, the parts being so arranged that the cell is capable of receiving light only from below. Thus, as is apparent from Fig. 1, the light emitted from the pilot light 23 is directed downwardly against the compass card and reflected upwardly therefrom into the photoelectric cell 25 in varying amounts in accordance with the particular character of that part of any of the zones on the card upon which the beam impinges. Consequently, when the beam from the pilot impinges on one of the neutral zones 12, which are relatively narrow measured circumferentially of the card, a certain amount of light is reflected therefrom to the photoelectric cell, and this condition will obtain as long as the vessel moves on a substantially predetermined course, that is, as long as the card does not rotate appreciably in either direction with respect to the binnacle. Should the vessel depart from this course, however, by an amount sufficient to rotate the card relatively to the binnacle enough to bring the beam from the pilot light onto either the adjacent white zone 13 or black zone 14, depending on the direction in which the vessel's head swings and consequent direction of relative movement between the binnacle and the compass card, more or less light will be reflected to the photoelectric cell, and this condition will obtain as long as the beam remains on either of the said zones. It will thus be apparent that after the vessel is placed on a given course, conveniently by the use of the hand steering mechanism, the arm 16 through the medium of the knob 17 can be turned until the slot in the shield 26 is positioned directly above one of the neutral zones 12, the degree scale 19 and pointer 18 being of assistance in thus positioning the arm, so that when the pilot light is illuminated its beam will be reflected from this neutral zone into the photoelectric cell as long as the vessel follows the given course sufficiently closely to prevent the beam from passing to either of the adjacent white or black zones, and a substantially constant rate of current will thus be delivered from the cell which, as well as the pilot light, is connected, as hereinafter more fully described, by means of wires running respectively thereto through the sleeve as shown in Fig. 1.

Reference will now be made to the means provided for steering the vessel by hand which is shown more or less conventionally in Fig. 4.

This mechanism comprises the usual steering wheel W secured to a drum 31 about which pass the tiller ropes 32 which are then led over sheaves 34, 35 and secured respectively near the opposite extremities of the periphery of a floating steering quadrant 36. This quadrant is rotatably mounted on the rudder stock 37, a suitable bushing 38 being preferably interposed to form a bearing between the parts, and a somewhat similar but preferably smaller quadrant 40 is also mounted on the rudder stock above the quadrant 36 and fixedly secured to the stock so that both parts turn as a unit, conveniently, as shown, by squaring the upper end of the stock for reception in a correspondingly squared hole in the quadrant; thus, as the quadrant 40 is turned horizontally in either direction about the axis of the rudder stock as a center, the rudder 39 is correspondingly moved so as to steer the vessel.

The quadrants 36 and 40 are interconnected through a worm 41 on a shaft 42 journaled in suitable bearings 43 carried by the quadrant 36; this worm engages worm gear teeth 44 on the periphery of the quadrant 40 so that when the quadrant 36 is turned by means of the hand steering wheel, it effects, as a result of the interlocked relation of the two quadrants when the worm 41 is at rest, a corresponding movement of quadrant 40, the two quadrants moving as a unit about the axis of the rudder stock, thus permitting the vessel to be steered by hand in the ordinary way when and as desired.

The shaft 42 extends to a motor 45 also mounted on the quadrant 36, this motor being adapted to drive the worm in one direction or the other, depending on the energizing current which it receives, so that the rudder stock and rudder can be moved through the medium of the motor and the worm independently of any movement of the floating or loose quadrant 36; consequently, if the steering wheel or other part of the hand steering mechanism is locked against movement so that the floating quadrant 36 is held stationary, the vessel may be steered by suitable actuation of the motor 45. This locking of the wheel is preferably effected by means of a sliding bolt 50 extending through a flange 51 carried by a shaft 52 on which the wheel rotates, a spring 54 surrounding the bolt being operative to urge it into a socket 55 in the hub of the wheel when the socket is brought into alignment with the bolt; for releasably holding the bolt in retracted position clear of the socket, suitable means are provided such as a pin 56 extending transversely through the bolt cooperative with a slot 57 in the flange. Thus, by pulling out the bolt until the pin clears the face of the flange and then rotating the bolt slightly to disalign the pin with the slot, the bolt can be held out of locking position so that the wheel can rotate on its supporting shaft as when the boat is being steered by hand, while if the pin is brought into alignment with the slot so it can enter the latter, the bolt can move forward, under the influence of spring 54, and engage the socket 55, thus locking the wheel against rotation. Preferably, the various parts are so arranged that if the wheel is locked when the quadrants are symmetrically disposed with respect to each other as shown in Fig. 4, the rudder will be parallel to the keel of the vessel.

Associated with the hand steering wheel is a collector ring 60 electrically connected with the socket 55 and cooperative with a spring contact 61 suitably supported on but insulated from the flange 51; this spring contact is connected with a wire forming part of the steering circuit hereinafter described. The bolt 50, or rather, the socket in which it slides and with which it is in contact, is also connected with a wire forming part of the said circuit, so that a circuit is completed between these two wires when the hand steering wheel is locked through insertion of bolt 50 into the socket 55 as will hereinafter more fully appear, the bolt and socket thus forming a switch by means of which a flow of current between said wires can be established at will when the bolt and socket are aligned.

I shall now refer more in detail to the steering circuit and instrumentalities included therein as diagrammatically illustrated in Fig. 7 in which certain of the parts hitherto described are shown symbolically but with the same designating numerals. It will be appreciated that the primary function of the circuit now to be described is to operate motor 45 in one direction or the other when the vessel is being automatically steered whenever the head of the vessel deviates for more than a predetermined angle from the course on which the vessel has been set so as to thereby turn the rudder in the proper direction to return the vessel to that course, and to maintain the motor in deenergized condition as long as the vessel remains on that course or within the permissible limits of deviation therefrom which, as will hereinafter appear, are determined by the width of the particular neutral zone 12 on the compass card upon which the ray from the pilot light is focused.

To this end, the steering circuit includes, in addition to certain of the parts heretofore described, namely, the pilot light 23, photoelectric cell 25, which may have associated therewith a suitable amplifying tube which is not specifically illustrated as the use thereof is well understood, the switch 50—55 formed by bolt 50 and socket 55, and the motor 45, a pair of relays R, R', a safety switch X, motor switches S, S', a battery or other source of power B forming the main source of current supply, and an auxiliary battery B' for furnishing current to the photoelectric cell, together with leads for connecting these several parts together and certain, preferably manually operable, switches, disposed therein. The switches S, S' are of the double pole, electrically actuated type, and respectively control the flow of current to the motor 45 in such manner that when the switch S is closed and the switch S' open, the motor is driven in one direction, and when the switch S' is closed and the switch S is open, it is driven in the other direction. The relays R, R' are also of the double pole type and are respectively designed for actuation by relatively minute currents of different magnitude, the relay R, for example, being designed to function when a current of 25 milliamperes flows through its actuating solenoid and the relay R' when the current of 15 milliamperes flows through its corresponding solenoid, each relay being provided with a spring which serves to keep the contact-making elements in one position save when a current of sufficient intensity to overcome the tension of the spring is flowing through the relay. The electrically actuated safety switch X is preferably of such type that it is closed whenever any current is flowing through it, while the motor switches S, S', also electrically actuated, are of the double pole type, normally open save when current is flowing through their actuating solenoids.

Referring now to Fig. 7, it will be noted that from the positive side of the current source B a lead 70 is extended through switch 50—55 to one contact point of the safety switch X; this point in turn, is connected through the actuating solenoid of this switch to one side of the pilot light 23, and the other side of this light is connected to the current source B through the return or negative lead 71, the switch 50—55, solenoid, and light thus being in series in the main power circuit. From the other contact point of the safety switch a lead 72 extends to both contact points on one side of the relay R, and the points on the other side thereof are respectively connected by leads 73, 74 with the corresponding points on one side of the relay R'. From the contact points on the other side of this relay, leads 75, 76 respectively extend to the main lead 70 and are connected thereto between switch 50—55 and the current source B, switches 77, 78, desirably of the push button or other manually controlled type, being interposed in these leads. Current is supplied to the input side of the photoelectric cell 25 by the battery B' connected in series therewith, a switch 79 in the circuit permitting the battery to be cut off when the apparatus is not in use, while from the output side of the cell two leads 81, 82 respectively extend to the actuating solenoid of the relay R', thus connected in series with the cell, while the actuating solenoid of the relay R is connected across these leads by leads 83, 84.

The actuating solenoid of the switch S is connected by leads 86, 87 between the lead 75 and the main lead 71, the connection with the former being effected between the switch 77 and the relay R', while in a similar manner the actuating solenoid of the switch S' is connected by leads 88, 89 between leads 76, 71. The contact points on one side of the switch S are respectively connected by leads 91, 92 with the main lines 70, 71; from the positive point on the other side of this switch, a lead 93 is extended, having a branch 94 running to one side of the armature of the motor 45 and another branch 95 running to the negative point on the corresponding side of switch S', while the negative point on the switch S is connected by a lead 96 with the positive point on the same side of switch S'. Similarly, the contact points on one side of switch S' are respectively connected by leads 97, 98 with lines 70, 71, and the positive point on the other side of this switch with the opposite side of the armature of the motor 45 by a lead 99, the motor being desirably of the shunt wound type with its field directly connected to the main leads 70, 71.

Reference will now be made to the operation of the apparatus when assembled and connected substantially as hereinbefore described. It will be assumed for this purpose that the quadrants 36, 40 are occupying a symmetrical relation with respect to the keel of the ship and to each other so that the rudder is parallel to the keel and that the vessel is headed, for example, due north, and that switches 50—55, 77, 78, S, S' and X are open. It will be further assumed that it now be desired to continue the vessel on this course, using automatic steering. The north or zero point of the compass card of course now points to the north, and the sleeve 15 is consequently rotated through the medium of the head 17 until the photoelectric cell 25 is brought directly over any one of the neutral reflecting zones 12, a result which can be easily accomplished by bringing the pointer 18 to the same reading on the degree scale 19 on the binnacle head as is shown on the compass. If more than one set of reflecting zones is provided, it will be generally most convenient to utilize that one lying nearest the desired course as shown on the compass card but any of the other zones may be used if preferred. As under the assumed conditions the wheel W is in such position that the bolt 50 is aligned with socket 55, the wheel can now be locked without the necessity of turning it in either direction, thus closing the switch 50—55 and permitting the main power current to flow through the circuits 70, 71 and parts included therein. Preferably prior to the closing of switch 50—55, switch 79 is closed so as to energize the photoelectric cell, and as the beam from the pilot light 23 is reflected into the cell, a current is caused to flow therefrom through circuit 81, 82 of sufficient intensity to adequately energize the solenoid of relay R', consequently, relay R' makes connection between leads 74, 76 while the unenergized relay R maintains connection between leads 72, 73, the parts thus occupying the position shown in Fig. 7. Under these conditions, as switches 77, 78 are open, the function of these switches being hereinafter described, both motor switches S, S' are held open and no current can flow through the motor in either direction, so that it remains unenergized and quadrants 36, 40 remain in relatively fixed position through the interlock effected between them by worm 42. Consequently, as steering wheel W is locked against rotation, the rudder is maintained in fixed position and the vessel continues on the course on which it is then set until some condition arises which causes her to deviate therefrom sufficiently to move the beam from the pilot light 23 off the relatively narrow neutral reflecting zone or band 12 onto, for example, the adjacent white zone or band 13. As soon as this occurs, a greater amount of light is transmitted to the photoelectric cell 25 with the result that a current of sufficient intensity to energize the solenoid of relay R is caused to flow in circuit 81, 82, thus actuating the relay to complete circuit 72, 74 and break circuit 72, 73, relay R', of course, remaining in its previous condition. Thereupon current from the main lead 70 can flow through leads 72, 74, 76, 88, and 89 to main lead 71, thus energizing the solenoid of and closing motor switch S'. This permits the flow of the main power current from the line 70 through leads 97, 99 to the motor and thence through leads 94, 95 and 98 to return lead 71 with consequent actuation of the motor as long as this current continues to flow. Since worm 41 is thus set in motion, quadrant 40 is moved relatively to the locked quadrant 36 to turn the rudder in a direction proper to swing the head of the vessel back toward the proper course, with corresponding movement of the light beam toward the neutral reflecting zone 12. As soon as the beam passes onto that zone, the current flowing from the cell in circuits 81, 82 is diminished and relay R returns to its former position as shown in Fig. 7, opening switch S' and cutting off the current to the motor, which thus ceases to operate, leaving the quadrants in a slightly angular relation with respect to each other. This causes the vessel to continue swinging in the same direction since the rudder is now at a slight angle to the keel, but if this movement is sufficient to carry the light beam onto the adjacent dark zone 14, the rudder will be turned in the opposite direction, by the series of operations now to be described, and the head of the vessel again correspondingly swung in reverse direction toward the proper course. More particularly, as soon as the beam strikes the zone 14, the head of the vessel for any reason having deviated sufficiently from the predetermined course to effect that result, substantially all flow of current in circuit 81, 82 is interrupted, thus deenergizing the solenoid of relay R' which then acts to close circuit 72, 73, 75, 86 and 87 through the solenoid of switch S to close the latter and cause a flow of current from power line 70 through leads 91, 93, 94 to the motor and thence through leads 99, 96, 92 to return power line 71, thus energizing the motor in the opposite direction and correspondingly moving quadrant 40 with respect to locked quadrant 36 so as to swing the rudder in a direction to return the vessel to the proper course. Substantially as the latter is attained, the beam from light 23 again moves onto the neutral reflecting zone 12, thus reenergizing circuit 81, 82 to a limited degree and moving relay R' to the position shown in Fig. 7, thereby again establishing normal conditions of operation, but possibly, with the quadrants locked together in slightly dissymmetrical relation.

It will be apparent that by making the neutral reflecting zones 12 relatively narrow, the course of movement of the vessel can be very closely controlled since only a small deviation from that course is required to operate the motor in one direction or the other so as to turn the rudder in the proper direction to return the vessel thereto, while as long as she remains substantially on the proper course, no current flows through the motor and the rudder is maintained stationary. As the relays R, R' are very sensitive the motor is started and stopped almost simultaneously with any movement of the vessel sufficient to change the quantity of light directed into the photoelectric cell so that extremely accurate steering on a given course can be accomplished automatically and without any attention from the navigator. The vessel can be returned at any time to manual control by merely pulling out the bolt 50 and, preferably, opening switch 79 to cut off further flow of current to the photoelectric cell, while if it be desired to change from one course to another when the automatic steering is in operation, the bolt 50 is preferably retracted and the vessel set on the new course by hand, after which the automatic circuit is again cut in as hitherto described after the proper adjustment of arm 16 has been made.

The relative position of quadrants 36, 40 is immaterial when the vessel is being steered by hand and, consequently, if they are in non-symmetrical relation when automatic steering is discontinued and hand steering resumed, it is of no moment, since the rudder can at once be brought to proper position to hold the vessel on the desired course by suitable manual rotation of wheel W. However, when the vessel is to be steered automatically on a given course, it is desirable that prior to the closing of the switch 50—55 the rudder be aligned with the keel and the quadrants 36, 40 be in symmetrical relation, and to this end I preferably provide means for aligning the quadrants whenever it is requisite or desirable to do so, said means comprising switches 77, 78. Under normal conditions, these switches are always open as shown in Fig. 7, but it will be apparent that by closing switch 77, the solenoid of motor switch S can be energized to close that switch to drive the motor in one direction, or by closing switch 78, the solenoid of motor switch S' can be likewise energized to drive the motor in the other direction. Consequently, at any time while switch 50—55 is open, the motor 45 can be actuated through the medium of switches 77 or 78 to swing upper quadrant 40 into symmetrical relation with lower quadrant 36.

As these quadrants are ordinarily located at the stern of the vessel, it is desirable that means be provided through the medium of which the navigator can at any time inform himself if the quadrants are out of alignment and whether the upper quadrant is swung to starboard or port with respect to the lower, so that should he wish to bring them into their normal relationship, he will know which of the switches 77 or 78 should be closed and for how long a period it should be kept in that condition. To this end, I preferably arrange on but insulated from the quadrant 36 a pair of contact segments 105, 106 separated at their adjacent ends by a short block of insulating material 107, and provide quadrant 40 with an insulated contact pin 108, having its lower end adapted to bear on one or the other of the segments or on the block of insulating material, depending on the relative position of the quadrants; this contact pin is preferably of the spring pressed type so that a suitable yielding contact with the segments and/or block will be assured at all times. From the segment 105 a lead 110 is carried to a small indicating lamp 111 disposed on one side of the binnacle, or at any other convenient point, and thence to one pole of a battery B'' or other source of current ample for operating the lamp, while from the opposite segment 106 another lead 112 is carried to a similar lamp 113 desirably on the opposite side of the binnacle, and thence back to the other pole of the battery; from the contact pin 108 a lead 114 is carried to the center of the battery, a switch 115 being interposed therein so that the circuit may be interrupted when desired, all as best shown in Figs. 4 and 5. Thus, as long as the contact pin is in engagement with the insulated block 107, neither lamp 111 nor 113 will be lighted when the switch 115 is closed, but whenever the pin engages one or the other of the segments, lamp 111 or 113, whichever is in circuit with that segment, will be lighted, thus apprising an observer that the upper quadrant has been swung with respect to the lower toward that side of the vessel on which the lighted lamp is disposed, that is, if lamp 111, which may be green to indicate starboard, is illuminated, it designates to the observer that quadrant 40 has been swung to starboard, and if lamp 113, which may be red to indicate port, is illuminated, that it has been swung to port. Consequently, if it is desired to bring the quadrants into alignment at any time, switch 50—55 being open, it is only necessary to close either switch 77 or 78, whichever operates motor 45 in a direction to swing quadrant 40 back from the position it occupies as indicated by lamp 111 or 113, until the lamp is extinguished, which occurs when the pin passes off the contact segment and onto block 107, and to thereupon open the switch. Obviously, if the switch is not so opened when the lamp goes out, quadrant 40 through continued actuation of motor 45 will be swung past center, thus bringing the contact pin onto the other segment and lighting the other lamp; should this occur, it is only necessary to open whichever of the switches 77, 78 which has been temporarily closed and then close the other of said switches until both lamps are again extinguished, thus showing that the quadrants are substantially properly aligned. By the means to which reference has just been made, it is therefore possible for the navigator at all times to be informed of the relative position of the quadrants and to bring them into substantial alignment preparatory to throwing in the automatic steering mechanism or any other time should he wish to do so.

Mention has been made of the safety switch X, the principal function of which is to prevent the vessel from materially departing from the given course upon which she is being automatically steered should the pilot light burn out and thus cut off the admission of light to the photoelectric cell, a condition which would then approximate that obtaining when the beam from the pilot light impinges on one of the dark zones 14. Of course, under this last condition motor 45 is immediately started but only maintained in operation as long as the light beam remains on said dark zone, the movement of the rudder so induced operating to return the vessel to the proper course as already explained, but should the rudder movement be brought about by failure of the pilot light, there would be nothing to arrest it, and the rudder would continue to be moved more and more from its straight line position until worm 41 ran off quadrant 40 or the rudder reached a position beyond which it could move no farther, which might result in burning out the motor, while the vessel would be progressively and correspondingly swung farther and farther from its proper course instead of being automatically returned thereto. To avoid this contingency, safety switch X is provided and so arranged that upon burning out of the pilot light, it will interrupt circuit 70, 72 and thus prevent any energization of the solenoids of motor switches S, S'; in consequence, the vessel will temporarily continue substantially on the course on which it was headed at the moment when the light failed and no harm will result before the light can be replaced.

While I have herein described and illustrated with considerable particularity a form of the invention which is suitable for installation on numerous types of vessels, I do not thereby desire or intend to limit or restrict myself specifically thereto or to the use of any particular instrumentalities as component elements thereof, as many instrumentalities other than those to which I have referred may be utilized in lieu thereof if desired, and numerous changes and modifications made in the various circuits through the medium of which they are interconnected and actuated, without departing from the spirit and scope of the invention as defined in the appended claims.

Having thus described my invention, I claim and desire to protect by Letters Patent of the United States:

1. The combination with a vessel having a rudder, of means for automatically controlling the position of the rudder in correspondence with variations in the course of the vessel, comprising a compass having a card provided with adjacent zones of different reflecting capacity, a photoelectric cell disposed adjacent the card, the latter being relatively movable with respect to the cell, means for directing a beam of light toward the zones on the card for reflection thereby into the cell to vary the output thereof in accordance with the particular zone on which said beam impinges, a reversible motor, means interconnecting the rudder and the motor, a pair of relays respectively adapted for actuation in accordance with the output of said cell, a pair of switches the closing of one of which causes the motor to run in one direction and the closing of the other of which causes it to run in the opposite direction, and connections between said relays and said switches whereby when one of said relays is energized from said cell both of said switches are kept open, when neither of said relays is so energized one of said switches is closed, and when both of said relays are so energized the other of said switches is closed.

2. Steering apparatus including, in combination with a vessel having a rudder, a reversible motor interconnected with the rudder, a source of power for energizing the motor, a pair of normally open electrically actuated switches interposed between said motor and said source respectively adapted when closed to permit a flow of current to the motor to drive it in one direction or the other to turn the rudder, a photoelectric cell, means for maintaining a substantially constant output from the cell so long as the vessel remains substantially on a given course, means for automatically varying said output upon a predetermined departure from said course in either direction, and means comprising a pair of relays of different sensitivity operative in accordance with the output of said cell to maintain said switches open while the vessel is substantially on said course and to selectively close said switches to move the rudder through the medium of the motor in a direction to swing the vessel toward said course upon a material departure therefrom.

3. The combination with a vessel having a rudder and a rudder stock, of steering means comprising a pair of quadrants one loosely and the other fixedly mounted on the rudder stock, the fixed quadrant having gear teeth on its periphery, a worm carried by the loose quadrant engaging said teeth, means including a motor for driving the worm also carried by said loose quadrant, hand steering means associated with the loose quadrant through the medium of which both quadrants can be turned as a unit to steer the vessel, and means for automatically driving the motor in one direction or the other to effect relative movement between said quadrants independently of the hand steering means including a photoelectric cell, a compass having a card, means for varying the output of said cell in accordance with its relative position with respect to said card, and means for controlling the flow of current to the motor and the direction of such flow in accordance with the output of said cell.

4. Steering apparatus including in combination with a vessel having a rudder, a reversible motor interconnected with the rudder, a source of power for energizing the motor, a pair of normally open electrically actuated switches interposed between said motor and said source respectively adapted when closed to permit a flow of current to the motor to drive it in one direction or the other to turn the rudder, a photoelectric cell, means for producing a low output from the cell upon a departure of the vessel from a given course in one direction, an intermediate output when the vessel remains substantially on said course and a large output upon a departure of the vessel from said course in the opposite direction, and means comprising a pair of relays of different sensitivity operative in accordance with the output of said cell to maintain said switches open while the vessel is substantially on said course and to selectively close said switches to move the rudder through the medium of the motor in a direction to swing the vessel toward said course upon a material departure therefrom.

5. In a ship steering system, a single photoelectric cell, a source of light, a compass card arranged to permit the light from said source to fall on the cell in varying degrees according to the position of the card relative to the light and cell, a circuit controlled by said varying light, a reversible motor controlled by said circuit, and means for driving the motor in one direction when an insufficient amount of light falls on the cell and in the opposite direction when a relatively large amount falls thereon, the motor being inoperative when an intermediate amount falls thereon, and a steering rudder operated by said motor.

6. Steering apparatus for use with a vessel having a rudder, comprising a reversible motor adapted to be interconnected with the rudder, a source of power for energizing the motor, a pair of normally open electrically actuated switches interposed between said motor and said source respectively adapted when closed to permit a flow of current to the motor to drive it in one direction or the other to turn the rudder, a photoelectric cell, means for producing a low output from the cell upon a departure of the vessel from a given course in one direction, an intermediate output when the vessel remains substantially on said course and a large output upon a departure of the vessel from said course in the opposite direction, and means comprising a pair of relays of different sensitivity operative in accordance with the output of said cell to maintain said switches open while the vessel is substantially on said course and to selectively close said switches to move the rudder through the medium of the motor in a direction to swing the vessel toward said course upon a material departure therefrom.

7. In a ship steering system, a single photoelectric cell, a source of light, a compass card arranged to permit the light from said source to fall on the cell in varying degrees according to the position of the card relative to the light and cell, a circuit controlled by said varying light, a reversible motor controlled by said circuit, and means for driving the motor in one direction when an insufficient amount of light falls on the cell and in the opposite direction when a relatively large amount falls thereon, the motor being inoperative when an intermediate amount falls thereon, and a steering rudder operated by said motor, said compass card being provided with three adjacent zones, having different reflection factors, that of the central zone being intermediate between those of the other two.

8. In a steering system, a compass card having portions differing in their capacity to transmit radiant energy, a device for converting said radiant energy into electric energy, a steering device, and means between said source of electric energy and said steering device for turning the steering device in one direction or the other or for releasing it, according as an intermediate portion or a portion on one side or on the other of said intermediate portion is in proper position relative to said source of radiant energy and said energy converting device, said means including a reversible motor.

GEORGE E. MIRFIELD.